United States Patent [19]

Nemit

[11] 3,737,908
[45] June 5, 1973

[54] DOPPLER NAVIGATION BEACON SYSTEM WITH ANGULAR FILTER

[75] Inventor: Jeffrey T. Nemit, Canoga Park, Calif.

[73] Assignee: International Telephone and Telegraph Corporation, New York, N.Y.

[22] Filed: Apr. 6, 1972

[21] Appl. No.: 241,717

[52] U.S. Cl. ......... 343/754, 343/106 D, 343/108 M, 343/909, 333/73 W
[51] Int. Cl. .................................................. G01s 1/18
[58] Field of Search .................. 343/106 D, 108 M, 343/754, 854, 909; 333/73 W

[56] References Cited
UNITED STATES PATENTS 3,670,338  6/1972  Earp ............................... 343/108 M Primary Examiner—Eli Lieberman
Attorney—C. Cornell Remsen, Jr., Walter J. Baum, Thomas E. Kristofferson et al.

[57] ABSTRACT

An antenna system particularly adapted for use with commutated array Doppler Navigation Beacons. Particularly in elevation determination where the Doppler array is vertically oriented, ground reflections produce multiple path errors. A fixed passive near-field microwave filter structure transmits energy from the array substantially only within an angular band on either side of a radiation normal. Parallel plate structure in the one embodiment uses a vertically extended tapered matching section within the parallel plate structure. The other embodiment employs a wire grid structure within the parallel plate structure. Both embodiments illustrated provide for angle of incidence (or radiation) sensitivity.

8 Claims, 12 Drawing Figures

3,737,908

DOPPLER NAVIGATION BEACON SYSTEM WITH ANGULAR FILTER

BACKGROUND OF THE INVENTION

1. Field of the Invention

The invention relates generally to antenna systems, and more particularly, to ultra-high frequency and microwave commutated array Doppler navigation beacon systems.

2. Description of the Prior Art

Navigation beacons based on commutation of the elements of a linear array, in order to produce a simulated Doppler effect at a remote receiving station, such as an aircraft on final landing approach, are known. U.S. Pat. No. 3,626,419 describes such a system in elementary form. In such a system a source of frequency $f_o$ moves along a linear path at velocity $v_x$. The signal observed at an angle $\phi$ for one scan across the antenna is composed of two parts. These are the direct signal at frequency $f_d$, and the reflected signal at frequency $f_r$. In using the above mentioned known device for elevation angle determination, ground reflection is a major source of error. The signal thus received at a remote point thus may be identified as g ($\phi t$) an expression in terms of radiated or direct signal and reflected signal, $f_d$ and $f_r$, respectively, is given by:

$$g(\phi,t) = A(t) \{\exp i (2\pi f_d t) + \Gamma \exp i (2\pi f_r t + \psi)\}$$

$f_d$ and $f_r$ are respectively:

$$f_d = f_o (1 + v_x/c \sin \phi) \text{ and } f_r = f_o(1 - v_x/c \sin \phi)$$

For reference: $c$ = speed of light
$A(t)$ = Amplitude of radiated signal
$\Gamma$ = Reflection coefficient
$\psi$ = Path phase difference plus relection phase As indicated in the above relations, the received signals experience a Doppler frequency shift at the remote receiving point. In the normal situation, i.e., with the approaching aircraft above the top of the vertically oriented elevation determining Doppler array, the direct signal Doppler shift is positive. The refelected signal Doppler shift is negative, since it emanates from the antenna at a negative angle. The measurement of Doppler shift in frequency provides angle information to the observer with respect to the Doppler antenna. In the known prior art system, a reference signal is typically radiated from a stationary antenna adjacent to the Doppler antenna so that the information frequency band can be down-converted to an audio frequency in the receiver.

In the prior art, arrangements are extant for dealing with ground reflections on the basis of frequency rather than amplitude, since the moving source has of itself substantially no directivity. In that connection, one approach involves the use of a filter in the receiver (at the remote station) which cuts off at a frequency corresponding to 0° elevation (i.e., the horizontal plane). Filtering in the receiver produces two problems of significance however. First, at low elevation angles the direct-signal spectrum is truncated and the reflected-signal is only partially rejected. Both of those effects produce errors in angle determination. The second significant problem involves poor rejection of a ground reflected signal in an environment where the ground surface slopes upward in the up-range direction from the beacon.

The manner in which the present invention solves the aforementioned difficulties will be evident as this description proceeds.

SUMMARY OF THE INVENTION

In consideration of the aforementioned state of the prior art and disadvantages resulting from known solutions to the ground reflection problem in an elevation determining system of the character described, the present invention includes the use of an angular filter placed in the near-field in front of the commutated array. The angular filter is fixed and passive.

Since the system of the present invention operates on an angular filtering theory, rather than on a frequency filtering approach, the aforementioned disadvantages do not associate with the present invention.

Basically, the angular filter of the present invention exhibits certain microwave lens characteristics. A vertical parallel plate arrangement is excited at the opening between one pair of opposite plate edges by the commutated array, and the other pair of edges define the physical aperture opening out in the principal direction of the desired radiation. Within the parallel plate and generally vertically disposed, is a filter arrangement consisting of either a narrow throat section extending generally vertically within the said parallel plates, or of a wire grid or elongated vertical conductor arrangement. Either of the described embodiments operates to afford angle of incidence (or radiation) selectivity. It may be said that the filter produces energy phase relationships over the said aperture which add vectorally to pass the signal through the filter within a predetermined angular bandwidth about a normal line. Energy for transmissional reception at other angles tend to be rejected. So-called "normal" is, in effect, the normal to the filter structure rather than the preferably horizontal normal line extending from the array itself. As the detailed description proceeds it will be noted that the filter section may be, or preferably is, tilted with respect to the linear array, since in a practical situation the lower edge of the angular transmission band should illuminate the ground surface as little as possible.

It may be said to have been the general objective of the present invention to produce an angular filter specifically for use with the commutated linear array in a Doppler navigational system.

BRIEF DESCRIPTION OF THE DRAWINGS

FIG. 2 b shows spectra for the signals of FIG. 2 a.

FIG. 3 b illustrates an idealized angular filter characteristic.

FIG. 5 b illustrates vector field relationships in a side view on the FIG. 5 a arrangement.

FIG. 5 c is an equivalent circuit of the embodiment of FIG. 5 a.

FIG. 6 b is an equivalent circuit of the embodiment of FIG. 6 a.

DESCRIPTION OF THE PREFERRED EMBODIMENTS

Figure 1:
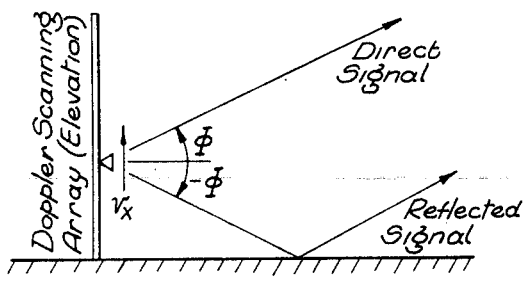
FIG. 1 illustrates the fundamental direct and reflected signals from a commutated Doppler array.

FIG. 1 illustrates a basic elevation Doppler antenna arrangement. A source of frequency $f_o$ moves along a linear path at velocity of $v_x$, as a result of commutation of the elements of the linear array successively. This produces a simulated Doppler signal as observed at a remote station receiving either the direct signal the reflected signal, or both. An array normal is established for reference and positive angles $\phi$ are those above this normal whereas negative angles minus $\phi$ are those below this normal. In the description of the prior art hereinbefore set forth, the mathematical relationships illustrating the effect of the reflected signal at the said remote station are given. It will be apparent from FIG. 1 that with the source velocity $v_x$ traveling in the direction of the arrow, a receiving station located higher than the array normal experiences a direct signal Doppler shift which is positive, since the source traveling in the direction of the arrow tends to decrease the direct path length. Obviously the reverse is true for the reflected signal Doppler shift which is negative in that case.

Figure 2A:
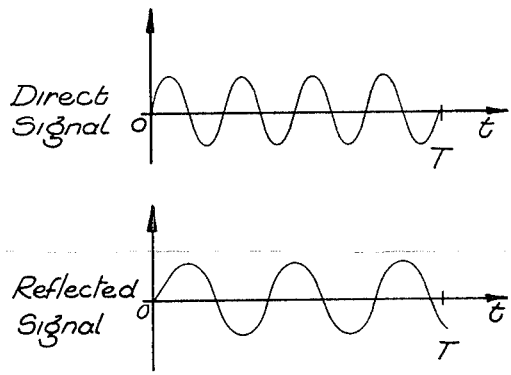
FIG. 2 a shows typical direct and reflected signal waves to emphasize their frequency difference.
Figure 2B:
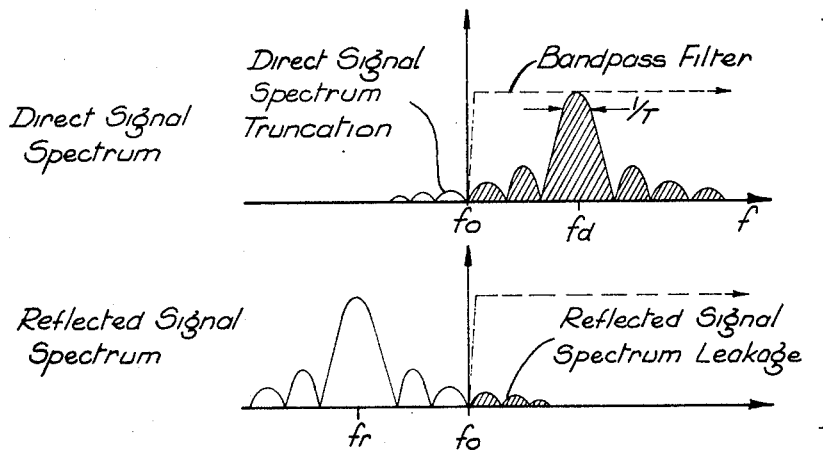

As previously indicated, a reference signal,(not illustrated) provides for a reference against which the Doppler signals may be extracted from the down converted Doppler array energy at the remote station. FIG. 2 a illustrates the difference in frequency from the Doppler array between direct and reflected signals in a somewhat exaggerated manner. FIG. 2 b presents corresponding spectral representations which are presented for a clearer understanding of the disadvantage of the prior art frequency related discrimination techniques hereinbefore described.

Figure 3A:
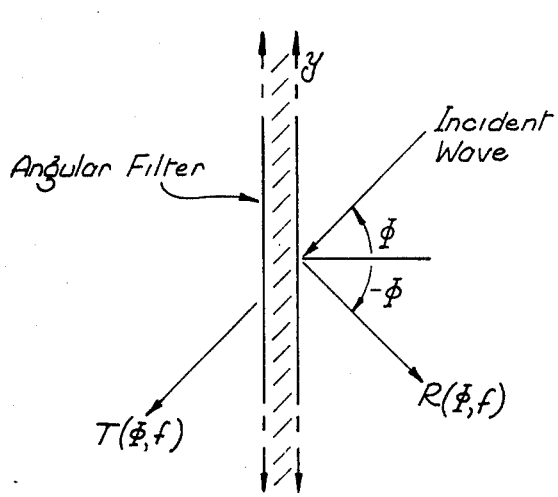
FIG. 3 a graphically defines parameters associated with an angular filter in accordance with the invention.
Figure 3B:
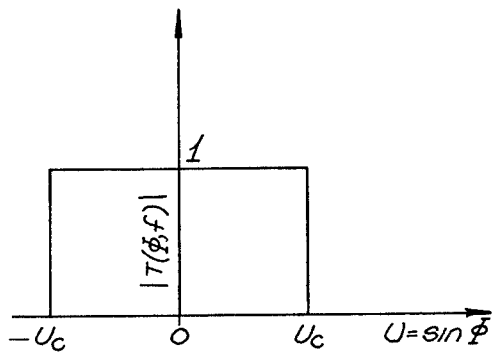

Referring now to FIG. 3 a, a generalized angular filter, that is, constructed in accordance with any one of the embodiments of the present invention herein described, is depicted in order to establish a graphical understanding of the parameters and notations used. FIG. 3 b illustrates the characteristics of an idealized angular filter and identifies the positive and negative points (in angle) at which it cuts off. For the purposes of illustration and description, it will be assumed that the angular filters and arrays of the present invention are being operated in a receiving mode, that is, with respect to waves incident thereon. Like most antenna system arrangements however, it is to be understood to be fully reciprocal and its normal mode of operation is a transmitting mode, since the antenna system of the present invention operates with a Doppler beacon system from which air derived navigational information is obtained by airborne remote stations.

If the structure of FIG. 3 a is uniform in the y direction, then a portion of the incident wave will be passed through the filter and a portion of it will be reflected. The magnitude of the wave thus passed through the filter is usually a function of angle and frequency and this dependence will be noted by: $T(\phi, f)$ = Transmission Function In many instances, inherent angle dependence of a transmission function has been viewed as an undesirable side effect, since in most cases, maximum transmission at all angles of incidence was desired, as for example, through a dielectric random. Referring again to FIG. 3 b it will be noted that the transmission function is symmetrical about the center line which is, in fact, the normal of the filter structure, bacause the structure is uniform in the y direction.

Figure 4:
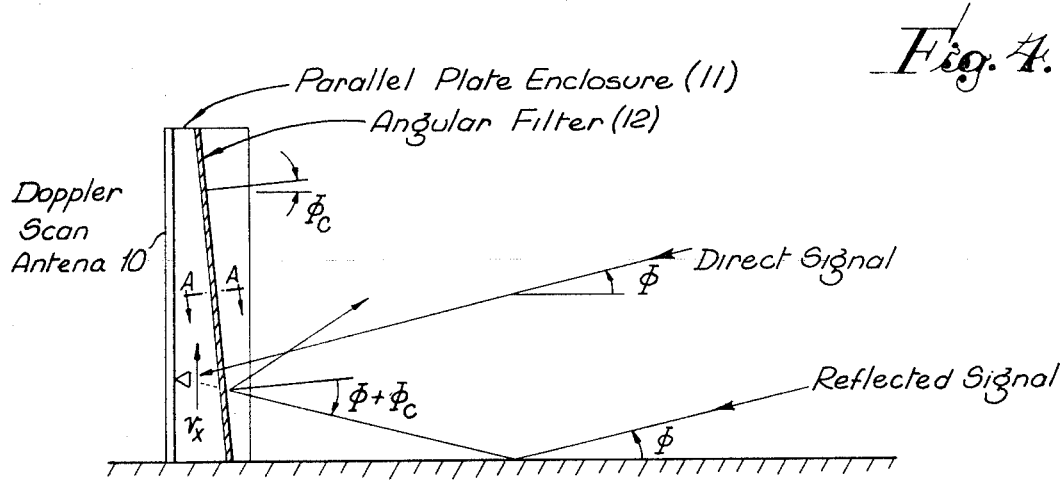
FIG. 4 shows a basic Doppler array as depicted in FIG. 1 with the angular filter of FIG. 3 a associated therewith.

Referring now to FIG. 4, a side elevation view of the adaptation of an angular filter 12 to a Doppler scan antenna 10 between parallel plate enclosures 11, is illustrated. From the notations thereon, it will be realized that for $|\phi - \phi_c| < \phi_c$, the direct signal is passed, and for $\phi + \phi_c > \phi_c$, the reflected signal is rejected.

The filter is tilted at an angle $\phi_c$ so that the angular passband is in the coverage region typical for an aircraft glidpath, and the lower cutoff angle is near the horizon. The expedient of housing the filter between a parallel plate structure 11 facilitates the construction of the filter with minimum cross-section.

As previously indicated, the system is being viewed as a receiving arrangement rather than in the actual transmission mode for convenience. A wave incident from the right on FIG. 4 at an angle $\phi$ is in the angular passband and passes through the filter. This component is sampled by the moving "pickup" in the normal way. A ground reflected wave incident at an angle minus $\phi$ however, is outside the passband and is reflected by the filter. The effect of this multi-path signal is therefore avoided.

Figure 5A:
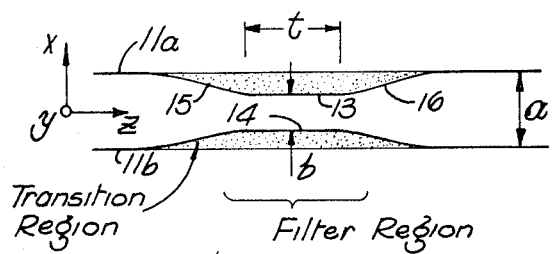
FIG. 5 a illustrates a vertical view of the parallel plate and throat section embodiment of the invention.
Figure 5B:
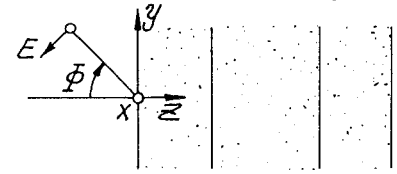
Figure 5C:
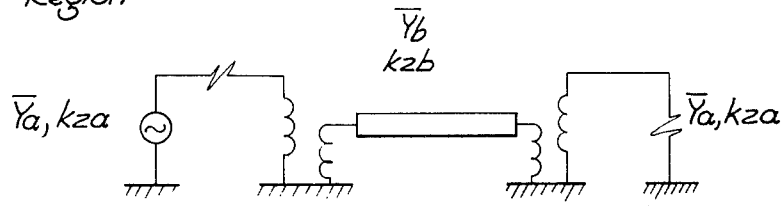

Referring now to FIG. 5 the physical details and equivalent circuit of a first parallel plate angular filter embodiment is shown. The mode of propagation considered is H-type with respect to the x-direction; the x component of electric field is therefore 0. In FIG. 5 a, the parallel plates are depicted as 11a and 11b, excited by a wave from the left of the drawing. A filter section is introduced by the reduction in cross-sectional spacing between 13 and 14, typical smooth transmissions being provided by 15 and 16 for both sides. The major plates spacing, "a," must be such as to propagate the energy at the frequency of concern, that is, the spacing, "a," would be between one-half and one full wavelength wide. The narrowed spacing b is such that the throat provides a cut-off filter when:

$$\cos \phi = \lambda 0/2_b$$

$$U_c = \sin \phi_c = \sqrt{1 - (\lambda 0/2b)^2}$$

Thus, at angles less than the critical angle $U_c$, the signal is passed and at angles greater than the critical angle, the signal is reflected. This may be thought of as being somewhat analogous to a wave incident on a dielectric medium with an effective relative dielectric constant less than unity, where $k_{effective} = 1 - (\lambda 0/2b)^2$ The general characteristics of the passband achieved by the structure of FIG. 5 a are much the same as illustrated in the idealized FIG. 3 b, except that the "skirt" attenuation is, of course, finite. This skirt attenuation is computed approximately as follows:

$$U = U_c + \delta U \alpha_b t = 2\pi/\lambda 0 \; t \sqrt{2U_c \delta U + \delta U^2} \approx 2\pi/\lambda 0 \; t \sqrt{2U_c \delta U}$$

The angle at which 8.6 decibles of attenuation occurs is calculated as follows:

$$\delta U = \lambda 0^2/8\pi^2 t^2 \sin \phi_c$$

To demonstrate the high degree of selectivity, which is possible, consider the following example:

$\phi_c = \pm 10 \quad t = 3 \lambda_0$ $\delta U = 0.009$ radians or about $0.5°$ The skirt selectivity calculated above is based on the assumption that the angular filter is infinite in height. Actually, for a filter of finite dimensions, the skirt "roll-off" cannot be faster than the diffraction limitation imposed by its vertical size. This indicates that the parameter "t" is effective in controlling the skirt selectivity only up to a certain maximum value.

The equivalent circuit FIG. 5 c is best described mathematically in terms of the actual parameters of FIG. 5 a as follows:

$$\overline{Y} = \omega \mu Y = (K_0^2 - K_x^2)/K_z$$

$$K_z^2 = K_0^2 - K_x^2 - K_y^2$$

$$K_y = K_0 \sin \phi$$

$$K_0 = 2\pi/\lambda_0$$

$$K_{xa} = \pi/a \approx O \qquad K_{xb} = \pi/b$$

$$\overline{Y}_a \approx K_0/\cos \phi \qquad \overline{Y}_b = \sqrt{K_0^2 \cos^2_\phi - (\pi/b)^2}$$

$$K_{za} \approx K_0 \cos \phi \qquad K_{zb} = \sqrt{K_0^2 \cos^2 \phi - (\pi/b)^2}$$

Figure 6A:
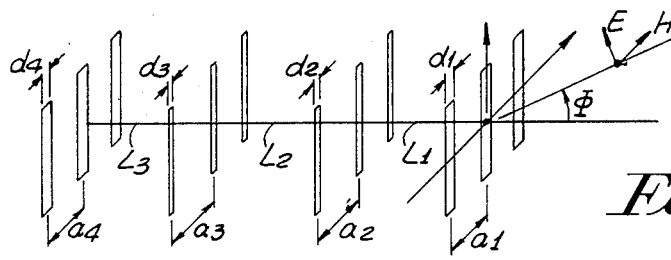
FIG. 6 a illustrates a multiple wire-grid angular filter.
Figure 6B:
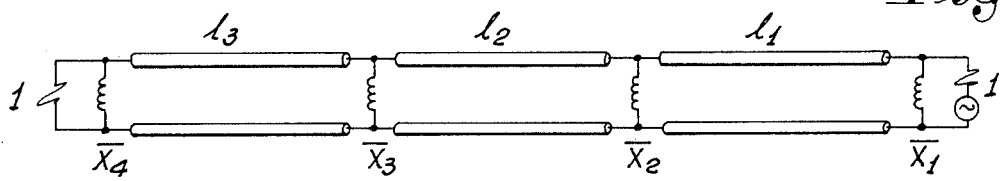

Referring now to FIG. 6, a more-or-less generalized form of multiple wire grid angular filter is illustrated. The individual strips of FIG. 6 a are to be understood to cover the commutated array in the vertical dimension much as has been indicated for the embodiment of FIG. 5a. The embodiment of FIG. 6 a comprises a series of metal grids spaced at approximately half wave intervals $L_1$, $L_2$ and $L_3$. FIG. 6 b is the equivalent circuit of FIG. 6a. This circuit is based on the development of S. B. Cohn described in a paper entitled "Direct Coupled Resonator Filters," Proceedings of the IRE, Vol. 45, Pages 187–196, Feb. 1957. The theory set forth by that reference can be used to calculate circuit parameters. An interesting feature of this circuit is that the transmission function can be described by a single variable which combines both angle and frequency. The frequency and angular bandwidth are therefore integrally related, as might be expected for dispersive media. These relationships are illustrated as follows:

$$\overline{X}_k = X_{ko}(f\cos \phi/f_o)$$

$$X_{ko} \cong Ak/\lambda_o \ln \{\csc (\pi dk/2A_k)\}$$

$$K_z = (2\pi/\lambda) \cos \phi = (2\pi/c) f \cos \phi$$

$f_o$ = band center frequency $\phi$ = O band center angle $k = K_z \mathbf{1}_k$ therefore, $T(\phi, f) = T(f \cos \phi)$.

Reference is made to the equivalent circuit of FIG. 6 b in connection with the above described analysis.

Figure 7:
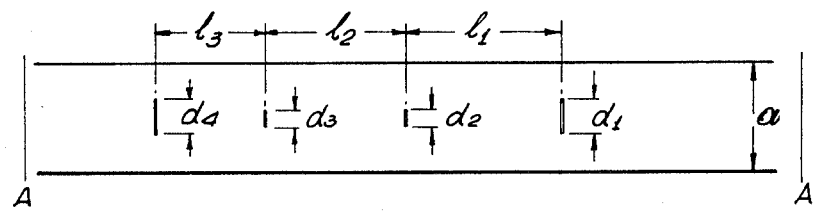
FIG. 7 illustrates an angular filter embodiment adapting the wire grid angular filter to the parallel plate structure, per section A—A of FIG. 4.

FIG. 7 illustrates the section as viewed along section line AA of FIG. 4 in connection with a third embodiment of the present invention. This third embodiment is essentially a modification of FIG. 6 for more compact implementation using parallel plates in a manner analogous to that of FIG. 5 a. The structure of FIG. 7 responds to the same plate spacing relationship, namely: $1/2 < a/\lambda < 1$, as applies to FIG. 5 a. Moreover, the analysis of physical parameters may be made in similar manner as for FIG. 6 a hereabove set forth. The structure of FIG. 7 is similarly adaptable to the Doppler system illustrated in FIG. 4, thereby producing a much more compact structure than that available using an angular filter structure according to FIG. 6 a.

Various modifications and variations falling within the spirit of the present invention will suggest themselves to those skilled in this art, once the principles of the present invention are understood. Accordingly, it is not intended that the scope of the present invention should be limited by the drawings or this description, these being typical and illustrative only.

What is claimed is:

1. In a Doppler Navigation beacon system the combination comprising:
   a radio frequency transmitter;
   a generally vertically oriented linear array of elements arranged to be successively energized by said transmitter for elevation angle determination at a remote point by observed simulated Doppler shift as a function of said successive energization; and filter means mounted in front of said array for passing radiation from elements thereof within a band of angles and for substantially rejecting energy at other angles.

2. A Doppler Navigation Beacon antenna system for discriminating against energy outside a predetermined angular band of radiation and reception angles, comprising:
   a linear array including a plurality of radiating elements extending in a vertical plane and means for commutating the excitation of said elements in a predetermined sequence;
   a parallel plate enclosure extending with its long dimension substantially vertically, said array being located to energize the space between said plates from the opening along one pair of opposite vertical edges of said plates, the other pair of opposite vertical edges comprising an aperture;
   and means in the field of said array within said parallel plate enclosure controlling the phase additions at said aperture to pass radio frequency energy substantially within a predetermined angular passband centered above the nromal of said array and to reflect energy at angles outside said angular passband.

3. Apparatus according to claim 2 in which said means in the field of said array is fixed, passive and generally vertically oriented but varying from the actual vertical by an amount sufficient to raise the radiation normal by a predetermined angle above the horizontal plane.

4. Apparatus according to claim 2 in which said parallel plates are spaced at least one half wavelength but not more than one wavelength.

5. Apparatus according to claim 4 in which said means in the field of said array comprises a throat section within the space between said plates, said throat including a smoothly narrowed area in horizontal section between said plates, said area being elongated generally vertically.

6. Apparatus according to claim 5 in which said throat includes transition means whereby the lateral spacing of said plates within said throat increases gradually on both the array and aperture sides of said throat.

7. A apparatus according to claim 2 in which said means in the field of said array comprises a wire grid angular filter indlucing a plurality of conductors extending symmetrically between said plates running generally vertically, said plurality of conductors further being spaced in a predetermined pattern in a plane of parallel to said plates.

8. Apparatus according to claim 3 including transmitting means connected to said commutating means so that said antenna system operates in the transmitting mode and thereby produces a radiation pattern in the elevation plane within said angular pass band centered around the normal of said means in the field of said array in the direction of radiation.

* * * * *